United States Patent [19]

Vanderbilt et al.

[11] Patent Number: 5,432,230

[45] Date of Patent: Jul. 11, 1995

[54] POLYPROPYLENE-GRAFT-UNSATURATED POLYESTER COMPOSITIONS AND PROCESS FOR THE PRODUCTION THEREOF

[75] Inventors: Jeffrey J. Vanderbilt, Longview, Tex.; Max F. Meyer, Jr., Kingsport, Tenn.

[73] Assignee: Eastman Chemical Company, Kingsport, Tenn.

[21] Appl. No.: 284,333

[22] Filed: Aug. 2, 1994

Related U.S. Application Data

[63] Continuation-in-part of Ser. No. 999,052, Dec. 31, 1992, Pat. No. 5,342,892.

[51] Int. Cl.⁶ .................... C08L 67/06; C08L 67/02; C08L 23/16
[52] U.S. Cl. ...................... 525/64; 525/67; 525/166; 525/168; 525/306
[58] Field of Search ............. 525/64, 67, 166, 168, 525/306

[56] References Cited

U.S. PATENT DOCUMENTS

| | | | |
|---|---|---|---|
| 3,235,625 | 2/1966 | Ballini et al. | 260/873 |
| 3,256,362 | 6/1966 | Craubner et al. | 260/862 |
| 4,172,859 | 10/1979 | Epstein | 428/402 |
| 4,219,628 | 8/1980 | Weemes et al. | 525/166 |
| 4,251,644 | 2/1981 | Joffrion | 525/64 |
| 4,368,295 | 1/1983 | Newton et al. | 525/166 |
| 4,558,096 | 12/1985 | Boon et al. | 525/166 |
| 4,639,481 | 1/1987 | Giles, Jr. | 524/128 |
| 4,771,108 | 9/1988 | Mackenzie | 525/92 |
| 4,780,506 | 10/1968 | Wefer | 525/67 |
| 4,956,501 | 9/1990 | Sunseri et al. | 525/64 |

FOREIGN PATENT DOCUMENTS

0443736A2 8/1991 European Pat. Off. .

Primary Examiner—James J. Seidleck
Assistant Examiner—I. Zemel
Attorney, Agent, or Firm—Mark A. Montgomery; Harry J. Gwinnell

[57] ABSTRACT

A propylene-graft-unsaturated polyester is disclosed comprising the reaction product of a polypropylene, an unsaturated polyester and a free radical initiator. The polypropylene-graft-unsaturated polyester is generally prepared by reacting at elevated temperatures using a peroxide. The polypropylene-graft-unsaturated polyester is very useful as a compatibilizing agent in blends of polyester and ethylene-propylene rubber to improve the impact strength of the polyester.

20 Claims, No Drawings

POLYPROPYLENE-GRAFT-UNSATURATED POLYESTER COMPOSITIONS AND PROCESS FOR THE PRODUCTION THEREOF

This application is a continuation-in-part of application Ser. No. 07/999,052, filed Dec. 31, 1992, now U.S. Pat. No. 5,342,892.

FIELD OF THE INVENTION

The present invention relates to a propylene-graft-unsaturated polyester. More particularly the present invention relates to polyesters of improved impact strength containing rubber and a polypropylene-graft-unsaturated polyester compatibilizing agent.

BACKGROUND OF THE INVENTION

Polyesters, particularly poly(ethylene terephthalate) (PET), are increasingly used in engineering type applications that require a combination of high modulus, high tensile strength, good surface appearance and good impact properties at ambient to low temperatures. PET possesses many desirable properties such as high modulus and high tensile strength and is generally used in applications when high notched Izod impact strength is not required. However, the poor notched Izod impact strength of polyesters like PET at 23° C. and below, limits their usefulness, particularly in molding applications since these applications require good impact strength.

Many methods of improving the impact strength of PET have been tried. These methods of improving the impact strength generally entail the incorporation of a rubber such as ethylene propylene rubber (EPR) modified with highly polar groups.

U.S. Pat. No. 4,771,108 discloses the blend of a polyester and an incompatible polyolefin in combination with an ionomer.

U.S. Pat. No. 4,219,628 discloses a polyester, such as poly(1,4-cyclohexylenedimethylene terephthalate) neat or modified, blended with EPR and an ionomer.

U.S. Pat. No. 4,639,481 discloses the composition containing minor amounts of a polyester such as PET and a major portion of an aromatic polycarbonate in combination with an olefin copolymer such as EPR.

U.S. Pat. No. 4,558,096 discloses the blend of PET and rubber blended with a compatibilizing agent such as an alkyl succinic anhydride.

U.S. Pat. No. 4,956,501 discloses a polyester composition containing a crosslinked blend of PET and grafted EPDM.

U.S. Pat. No. 4,368,295 discloses a blend of PET with a non-carboxylated polyolefin and a non-carboxylated EPR in combination with a carboxylated polyolefin.

U.S. Pat. No. 4,251,644 discloses the improvement of mechanical properties of nylon and polyester by blending with a rubber such as EPR that contains grafted highly polar groups.

U.S. Pat. No. 4,780,506 discloses a blend containing PET, aromatic polycarbonate and styrene-acrylonitrile grafted copolymers of EPDM.

U.S. Pat. No. 4,172,859 discloses a myriad number of combinations of blends of PET and polycarbonate containing various rubbers including maleic anhydride grafted rubber.

Although the above methods could in some instances improve the impact strength of the polyester, the resulting combination generally has poor physical properties and/or phase separates during melt injection molding. It would be very desirable to be able to produce a polyester composition such as a PET blend that has improved impact strength while retaining the polyester's good physical properties. It would also be very desirable to produce a polyester composition that has good physical properties and does not phase separate when molded.

SUMMARY OF THE INVENTION

The composition of the present invention comprises a polypropylene-graft-unsaturated polyester that is useful as a compatibilizing agent that comprises the reaction product of:

(a) about 1 to 99 wt. % of a polypropylene homopolymer or $\alpha$-olefin propylene copolymer containing at least 70 wt. % propylene;

(b) about 1 to 99 wt. % of an unsaturated polyester derived from an $\alpha,\beta$-ethylenically unsaturated dicarboxylic acid, saturated dicarboxylic acid, and saturated aliphatic polyol;

(c) about 0.1 to 1 wt. % of a free radical initiator.

The present invention also relates to the process for the production of the propylene-graft-unsaturated polyester and comprises:

(I) reacting;
  (a) about 1 to 99 wt. % of a polypropylene homopolymer or $\alpha$-olefin propylene copolymer containing at least 70 wt. % propylene; with
  (b) about 1 to 99 wt. % of an unsaturated polyester derived from an $\alpha,\beta$-ethylenically unsaturated dicarboxylic acid, saturated dicarboxylic acid, and saturated aliphatic polyol; in the presence of
  (c) about 0.1 to 1 wt. % of a free radical initiator; and (II) recovering a polypropylene-graft-unsaturated polyester.

The present invention also entails a blend and article produced therefrom that comprises (A) 0.5 to 5.0 wt. % of the polypropylene-graft-unsaturated polyester above;

(B) at least 50 wt. % of a polyester; and (C) at least 10 wt. % of an ethylene-propylene rubber containing at least a portion of a maleated ethylene-propylene rubber.

DETAILED DESCRIPTION OF THE INVENTION

Applicants have unexpectedly discovered a novel polypropylene-graft-unsaturated polyester that is useful as a compatibilizing agent in minor amounts with a blend of polyester and ethylene-propylene rubber. The polypropylene-graft-unsaturated polyester unexpectedly improves the impact strength of the polyester while using lower amounts of ethylene-propylene rubber than comparable polyester/rubber blends, without the polypropylene-graft-unsaturated polyester. When ethylene-propylene rubber is blended with polyesters, like PET, the desirable physical properties of the polyester, such as modulus, are reduced. Thus the use of the present polypropylene-graft-unsaturated in polyester/rubber blends increases the impact strength and other physical properties when compared to blends without the polypropylene-graft-unsaturated polyester.

Applicants have also unexpectedly discovered a polyester blend composition of improved physical properties that does not phase separate when melted. The blend of the present invention does not phase separate because the polypropylene-graft-unsaturated polyester is a compatibilizing agent keeping both the polyester and rubber in the same phase.

The polypropylene-graft-unsaturated polyester of the present invention is a composition that is a reaction product of
(a) about 1 to 99 wt. % of a polypropylene homopolymer or α-olefin propylene copolymer containing at least 70 wt. % propylene;
(b) about 1 to 99 wt. % of an unsaturated polyester derived from an α,β-ethylenically unsaturated dicarboxylic acid, saturated dicarboxylic acid, and saturated aliphatic polyol; and
(c) about 0.1 to 1 wt. % of a free radical initiator.

The polypropylene-graft-unsaturated polyester reaction product preferably has a concentration of about 40 to 90 wt. % (a) and 10 to 60 wt. % (b), more preferably about 50 to 70 wt. % (a) and 30 to 50 wt. % (b), with a concentration of about 60 wt. % (a) and about 40 wt. % (b) being most preferred. The polypropylene-graft-unsaturated polyester can have amounts of unsaturated polyester (b) below about 10 wt. % and above about 60 wt. %. However, concentrations of unsaturated polyester (b) much below 10 wt. % are less undesirable since the resulting product is not a very effective compatibilizing agent whereas concentrations of unsaturated polyester (b) much above 60 is less desirable due to higher levels of crosslinking.

It is very important that the amount of free radical initiator used in preparing the polypropylene-graft-unsaturated polyester be within the specified wt. % of 0.1 to 1 wt. % free radical initiator. Thus the amount of free radical initiator must not be much below about 0.1 wt. % or the reaction does not work at reasonable rates; whereas higher amounts above 1 wt. % free radical initiator significantly increase the crosslinking of the unsaturated polyester. At this amount of 0.1 to 1 wt. % the ratio of initiator/double bond in the unsaturated polyester is optimal. The free radical initiator used to prepare the inventive composition is preferably present in an amount of about 0.2 to 0.5 wt. %, with a wt. % of free radical initiator of about 0.3 to 0.4 being most preferred.

The polypropylene reactant of (a) is preferably an isotactic propylene homopolymer having a xylene solubles content of less than 10 wt. % at 25° C., preferably less than 5 wt. %, with a xylene solubles content of less than about 3 wt. % being most preferred.

Alternatively the polypropylene reactant of (a) is preferably a C2–C8 α-olefin/propylene random copolymer containing about 0.5 to 30 mole % α-olefin, preferably less than 10 mole % α-olefin, with an α-olefin concentration in the copolymer of less than 6 mole % being most preferred.

The polypropylene of reactant (a) used in the preparation of the polypropylene-graft-unsaturated polyester of the present invention can be made by conventional polymerization processes but is preferably made in a multiple reactor blend (impact copolymer) type process, typically prepared by a gas-phase process in which polypropylene homopolymer is prepared in one reactor and rubbery α-olefin-propylene copolymer is prepared in the second reactor in the presence of the first reactor product as disclosed in Plastic Engineering, pp 29–32, February 1987. The amount of polymer produced in the second reactor can vary from 2 to 50% preferably 5 to 35% and most preferably 7 to 25 %. The level of α-olefin comonomer in the second reactor product can vary from 5 to 95%, preferably 30 to 70 mole % with a concentration of 40 to 60 mole % being most preferred. The molecular weight of this polypropylene as measured by melt flow rate (MFR) at 220° C. by ASTM Method D 1238-85 can vary from 0.2 to 500 grams per 10 minutes, preferably 0.5 to 50 grams per 10 minutes with a MFR of about 1 to 20 grams per 10 minutes being most preferred.

The unsaturated polyester reactant of (b) is preferably prepared from an α,β-ethylenically unsaturated dicarboxylic acid, saturated dicarboxylic acid, and saturated aliphatic polyol in a concentration such that the hydroxyl groups present during the reaction are in a 5 to 25% molar excess over carboxyl groups of the α,β-ethylenically unsaturated dicarboxylic acid.

The α,β-ethylenically unsaturated dicarboxylic acid used in the preparation of the unsaturated polyester, reactant (b), is preferably selected from the acids, anhydrides, and esters, of the following acids: maleic, fumaric, substituted fumaric, citraconic, messaconic, teraconic, glutaconic, muconic, and the like and mixtures thereof.

The saturated dicarboxylic acid used to prepare the unsaturated polyester reactant of (b) is present in a concentration of no greater than 80 mole % of the total equivalence of carboxyl groups (carboxyl groups equaling 100 mole % and hydroxyl or polyol groups equaling 100 mole %). The amount of saturated dicarboxylic acid is more preferably present in a concentration of about 30 to 75 wt. % of total equivalence of carboxyl groups. The saturated dicarboxylic acid is preferably selected from the group consisting of the acids, anhydrides, or esters of oxalic, malonic, succinic, glutaric, sebacic, adipic, phthalic, isophthalic, terephthalic, substituted phthalic, and the like and mixtures thereof.

The saturated aliphatic polyol used to prepare the unsaturated polyester, reactant (b), is preferably a diol selected from the group consisting of ethylene glycol, propylene glycol, butylene glycol, diethylene glycol, dipropylene glycol, triethylene glycol, tetraethylene glycol, 1,2-butanediol, 1,3-butanediol, 1,4-butanediol, 1,2-pentanediol, 1,4-pentanediol, 1,5-pentanediol, 1,6-hexanediol, neopentyl glycol, 2,2,4-trimethyl-1,3-pentanediol and the like and mixtures thereof.

It is preferred that the unsaturated polyester, reactant (b), be essentially linear in that the monomers used in the preparation of reactant (b) have no more than two carboxyl or hydroxyl groups. Only zero to minor amounts of a polyol having three carboxyl groups should be used in preparing reactant (b). When a polyol containing more than two hydroxyl groups is employed as a portion of the saturated aliphatic polyol it is only present in a minor amount, generally not more than 1 mole %. When a polyol having more than two hydroxyl group is employed in the preparation of the unsaturated polyester reactant (b) it is selected from the group consisting of glycerol, trimethylol ethane, trimethylol propane, pentaerythritol, sorbitol and the like and mixtures thereof.

The number average molecular weight of the unsaturated polyester, reactant (b), is preferably about 500 to 5000 g/mole, more preferably about 1000 to 2500 g/mole.

The unsaturated polyester reactant (b) is more preferably comprised of maleic anhydride, phthalic or isophthalic acid, and at least one aliphatic glycol, with the preferred aliphatic glycol being neopentyl glycol.

The unsaturated polyester, reactant (b), can be prepared by conventional polyester preparation methods. Particular preferred methods are disclosed in U.S. Pat. No. 4,258,141 and U.S. Pat. No. 4,299,927 the disclosures of which are incorporated herein by reference in their entirety.

The free radical initiator (c) used in the preparation of the propylene-graft-unsaturated polyester is preferably a peroxide that has a half-life ($t_{\frac{1}{2}}$), at the reaction temperature, that is similar to the blending time. This generally means that, at the reaction or blending temperature, half of the peroxide is gone when the blending/reacting of (a), (b), and (c) is finished.

The peroxide used in the preparation of the propylene-graft-unsaturated polyester is preferably selected from the group consisting of t-butylhydroperoxide, di-t-butylperoxide, 2,5-dimethyl-2,5-di(t-butylperoxy) hexane, t-butylperbenzoate, 1,1,3,3-tetramethylbutyl hydroperoxide, and 2,5-dimethylhexyl 2,5-diperoxybenzoate, with 2,5-dimethyl-2,5-di(t-butylperoxy) hexane being most preferred.

The process for producing the polypropylene-graft-unsaturated polyester generally comprises:
(I) reacting
 (a) about 1 to 99 wt. % of a polypropylene homopolymer or α-olefin propylene copolymer containing at least 70 wt. % propylene; with
 (b) about 1 to 99 wt. % of an unsaturated polyester derived from an α,β-ethylenically unsaturated dicarboxylic acid, saturated dicarboxylic acid, and saturated aliphatic polyol; in the presence of
 (c) about 0.1 to 1 wt. % of a free radical initiator; and
(II) recovering a polypropylene-graft-unsaturated polyester.

The process for producing the polypropylene-graft-unsaturated polyester is preferably a blending process in which reactants (a), (b) and (c) are blended at a temperature above the melting point of the mixture of these reactants but below the degradation temperature of any one of the reactants, excluding the free radical initiator. This temperature is generally below 300° C. and preferably about 180° to 240° C., more preferably about to 210° C., with a temperature of about 200° C. being most preferred. The blending that is generally sufficient to produce a homogenous mixture is sufficient to form the reaction product of (a), (b) and (c). The blending reaction can be carried out in equipment that is typically used in blending viscous polymers, i.e. BRABENDER mixing heads, BANBURY mixers, single-screw extruders and twin-screw extruders. The most preferred equipment is generally a twin-screw extruder since it gives the most accurate temperature control and superior mixing capabilities.

The blend composition of the present invention comprises
(A) 0.5 to 5 wt. % of the polypropylene-graft-unsaturated polyester above;
(B) at least 50 wt. % of a polyester; and
(C) at least 10 wt. % of an ethylene-propylene rubber containing at least a portion of maleated ethylene-propylene rubber.

The blend preferably comprises about 1 to 3 wt. % (A), with a wt. % of (A) of about 2 being most preferred.

The blend also preferably comprises about 70 to 85 wt. % (B), more preferably about 72 to 84 wt. %, with a wt. % of (B) of about 75 to 80 being most preferred.

The blend also preferably comprises about 15 to 30 wt. % (C) more preferably about 15 to 25 wt. %, with a wt. % of (C) of about 15–20 being most preferred.

The polyester of (B) is preferably prepared from at least one dicarboxylic acid selected from the group consisting of terephthalic acid, isophthalic acid, aliphatic dicarboxylic acids having 3 to 20 carbon atoms and cycloaliphatic dicarboxylic acids having 8 to 10 carbon atoms. The polyester of the present invention is also preferably prepared from at least one glycol selected from the group consisting of aliphatic glycols having 2 to 10 carbon atoms and cycloaliphatic glycols having 5 to 10 carbon atoms.

The examples of more preferred dicarboxylic acids include terephthalic, isophthalic, 1,4-cyclohexanedicarboxylic, succinic, glutaric, adipic, azelaic, fumaric, maleic, itaconic, and the like and mixtures of acids. The examples of more preferred glycols include ethylene glycol, 1,3-propanediol, 1,4-butanediol, 1,5-pentanediol, 1,6-hexanediol, 1,8-octanediol, 1,9-nonanediol, 1,10-decanediol, 1,2-cyclopentanediol, 1,3-cyclopentanediol, 1,2-cyclohexanediol, 1,3-cyclohexanediol, 1,4-cyclohexanediol, 1,4-cyclohexanedimethanol, and the like and mixtures thereof. The most preferred polyester (B) used in the blend composition of the present invention is prepared from terephthalic acid and ethylene glycol and is a poly(ethylene terephthalate). The preferred poly(ethylene terephthalate) used in the blend of the present invention has an inherent viscosity of 0.4 to 1.0 in 60/40 phenol-tetrachloroethylene at 23° C.

The ethylene-propylene rubber used in (C) is preferably a maleic anhydride grafted random ethylene-propylene rubber copolymer component and is selected from the group consisting of (a) a maleic anhydride grafted ethylene-propylene rubber having a maleic anhydride concentration of about 0.3 to 5 wt. % and (b) a blend of maleic anhydride grafted ethylene-propylene rubber and unmodified ethylene-propylene rubber having a blend maleic anhydride concentration of about 0.05 to 5 wt. %.

The ethylene-propylene rubber of (C) is preferably a blend of unmodified ethylene-propylene rubber and maleated (maleic anhydride grafted) ethylene-propylene rubber. This blend is preferably a blend of unmodified (non-functionalized) ethylene-propylene rubber and maleated-ethylene-propylene rubber in a ratio of about 2 to 1 to about 1 to 2, more preferably 2 to 1. The unmodified ethylene-propylene rubber and maleated ethylene-propylene rubber blend preferably has a grafted maleic anhydride concentration of about 0.2 to 2 wt. %.

The ethylene-propylene rubber of (C). preferably has a melt viscosity at a given temperature and given shear rate (280° C. and 100 sec$^{-1}$) that is no more than twice and no less than half that of the polyester of (B). Thus by carefully matching the melt viscosities of the polyester and ethylene-propylene rubber in combination with minor amounts of grafted maleic anhydride and low crystallinity of the rubber a polyester blend of significantly improved impact strength is prepared.

The ethylene-propylene rubber of (C) is preferably a non-crystalline (amorphous) rubber and essentially has no crystallinity and a heat of diffusion ($\Delta H^f$) of less than 7 cal/g on second cycle as indicated by differential thermal analysis, preferably less than 3 cal/g with a heat of diffusion of less than 2 cal/g being most preferred.

The ethylene-propylene rubber of (C) preferably has an ethylene to propylene ratio of about 70/30 to about 30/70, more preferably about 45/55 to about 65/35, with a ratio of about 50/50 being most preferred. The blends of polypropylene-graft-unsaturated polyester, polyester, and ethylene-propylene rubber are useful as engineering plastics, particularly as molded articles and fibers. These articles are tougher and the fibers are more resistant to breakage.

The examples below describe specific exemplary embodiments of the present invention for illustration and are not intended to limit the reasonable scope thereof.

EXAMPLES

Inventive compositions were prepared with peroxide. As a control, compositions were prepared without peroxide. Grafting efficiency was determined by the level of crystallinity using 1,2,4-trichlorobenzene (TCB). In each case, the crystalline fraction, crystallized from 1,2,4-trichlorobenzene (TCB), was isolated. The unsaturated polyester (UP) is amorphous and does not crystallize from TCB. Polypropylene (PP) does crystallize from TCB. An excess of crystalline material above the level of PP in the original blend is indicative of grafted material, i.e., the PP-g-UP is crystalline. In each case presented in Examples 1–3, the peroxide-treated sample contained a higher level of crystalline material than the non peroxide-treated samples. This establishes that peroxide initiated grafting has occurred and increased the level of crystallinity above the level that would be present in a simple blend, i.e. for Table 1, compare entry one with entry two.

Additional evidence that grafting had taken place can be observed in comparing melting point, as determined by differential scanning calorimetry. In comparing the peroxide-treated (grafted) samples with the non-peroxide treated samples, the melting point was depressed for the peroxide-treated samples indicative of disruption of the crystalline structure of the PP, i.e. grafting.

Carbonyl content (CO) was measured on the TCB crystalline fractions of the blends. In each case given, see Table 1–3, the peroxide-treated (grafted samples) contained significantly higher levels of CO than the control blends, indicative of grafting.

Melt flow rate (MFR) is affected by each of the reactions described in the description section above. As the desired grafting reaction occurs, one would expect MFR to be less than observed for a blend. As peroxide initiated PP degradation occurs, MFR increases. As crosslinking occurs, MFR decreases. Thus, the final MFR of the composition depends on the extent that each of the above reactions occurs.

Example 1 describes blends prepared with PP homopolymer. A series of blends was prepared in which the level of unsaturated polyester was varied from 5 to 40 percent. In each case blends were prepared with peroxide initiator and, as a control, without peroxide initiator. Results are summarized in Table 1. Blends prepared with peroxideinitiator showed higher levels of crystalline content, higher CO, and depressed MP when compared with the appropriate control (without peroxide). These data are evidence that grafting has taken place. The MFR of blend 9 (60 percent PP/40 percent UP/peroxide) was much less than control, blend 8, prepared without peroxide. The decrease in MFR is indicative of grafting. Since all of the material was soluble in refluxing TCB, crosslinking was not a significant reaction.

Example 2 describes blends prepared with ethylene-propylene random copolymer. A series of blends was prepared in which the level of unsaturated polyester was varied from 5 to 40 percent. In each case blends were prepared with peroxide initiator, and as a control, without peroxide initiator. Results are summarized in Table 2. Blends prepared with peroxide initiator showed higher levels of crystalline content and higher CO when compared with the appropriate control (without peroxide). These data are evidence that grafting has taken place. The MFR of blend 9 (60 percent PP/40 percent UP/peroxide) was much less than control, blend 8, prepared without peroxide. The decrease in MFR is indicative of grafting. Since all of the material was soluble in refluxing TCB, crosslinking was not a significant reaction.

Example 3 describes blends prepared with PP impact copolymer. A series of blends was prepared in which the level of unsaturated polyester was varied from 5 to 40 percent. In each case blends were prepared with peroxide initiator and as a control without peroxide initiator. Results are summarized in Table 3. Blends prepared with peroxide initiator showed higher levels of crystalline content, higher CO, and depressed MP when compared with the appropriate control (without peroxide). These data are evidence that grafting has taken place. The MFR of blend 9 (60 percent PP/40 percent UP/peroxide) was much less than control, blend 8, prepared without peroxide. The decrease in MFR is indicative of grafting. Since all of the material was soluble in refluxing TCB, crosslinking was not a significant reaction.

The blends can more efficiently and economically be prepared using a twin-screw extruder, as described in Example 4. The product was 81 percent crystalline. The crystalline portion had high level of CO and depressed melting point.

Grafting efficiency was much poorer in the absence of peroxide as shown in Comparative Example 1. The crystalline content of product was essentially equal to the amount of PP in the blend. The level of CO was low.

The success of the grafting reaction was surprisingly sensitive to the level of peroxide. Thus, Experiment 4 was successful using 0.37 percent Varox R DBPH-50, and Comparative Example 2 was unsuccessful using 1.5 percent Varox ® DBPH-50 producing a highly-crosslinked product, with no detectable grafting, [CO]<0.2 percent.

It is essential that PP is present in the blend composition. This is illustrated by comparative Example 3 in which UP was treated with DBPH at different levels. Crosslinking was effected quantitatively with 1.5 percent DBPH-50. Gel content is the percentage of material which is insoluble in refluxing TCB.

Example 1

Polypropylene Homopolymer-Graft-Unsaturated Polyester

A BRABENDER PLASTI-CORDER (C. W. Brabender, Hackensack, N.J.) was charged with: polypropylene (PP) homopolymer, Tenite P4-012 (Eastman Chemical Company) MFR=2.0 grams per minute, Xs=3.8 percent; and unsaturated polyester (UP), based on neopentyl glycol (NPG from Eastman Chemical Company), terephthalic acid (TPA), and maleic anhydride, hydroxyl number=11, molecular weight=2060 grams per mole. The mixture was heated to 190° C. at low RPM. After the blend had melted, agitation was increased to 100 RPM and 0.1 gram (0.33 percent by weight of the entire mixture) of 2,5-dimethyl-2,5-(di-t-butylperoxy)hexane (VAROX DBPH-50 from R. T. Vanderbilt Co., 45 percent DBPH on CaCO₃) was added. The mixture was agitated at 190° C. at 100 RPM for 10 minutes. At this time 0.05 grams of tetrakis[methyelene 3-(3',5'-di-t-butyl-4'-hydroxyphenyl)propionate methane (IRGANOX 1010 from Ciba-Geigy) was added, and the mixture was agitated for an additional three minutes at 190° C. at 100 RPM. The blend was removed from the mixing head. Crystallinity was determined from 1,2,4-trichlorobenzene (TCB). Thus, 0.5 gram of the product was heated to reflux with ~300 mL of TCB for ~30 minutes. The solution was cooled to room temperature to effect crystallization, then filtered and washed with toluene. The crystalline content was represented by the material which crystallized from TCB. Melting point was determined on the crystalline fraction by differential scanning calorimetry (DSC). Carbonyl content (CO) was determined by infrared spectroscopy (IR). A calibration chart was developed for a series of carbonyl-containing polymers of known composition. Area at 1720 cm$^{-1}$/thickness was measured, and CO content was determined from the calibration curve. A series of blends in which the ratio of PP/UP was varied from 19/1 to 1.5 was prepared. For control the same series was prepared without peroxide (DBPH). The compositions and analysis by TCB recrystallization, DSC melting point, and IR Carbonyl (CO) are given in Table 1 below.

TABLE 1

Blends of Polypropylene Homopolymer with Unsaturated Polyester

| Run # | PP % | UP % | Peroxide | MFR g/10 min | Crystalline % | Melting Point °C. | % CO by IR |
|---|---|---|---|---|---|---|---|
| 1 | 100 | 0 |  | 2 | 97 | 161 | 0 |
| 2 | 95 | 5 | No | 6.11 | 88 | 161(146) | <0.2 |
| 3 | 95 | 5 | Yes | 100 | 94 | 159.2 | 1.3 |
| 4 | 90 | 10 | No | 7.18 | 84 | 160 | <0.2 |
| 5 | 90 | 10 | Yes | 70.9 | 43 | 160 | 0.6 |
| 6 | 80 | 20 | No | 40.1 | 75 | 163 | <0.2 |
| 7 | 80 | 20 | Yes | 67.0 | 88 | 160 | 3.6 |
| 8 | 60 | 40 | No | 83.4 | 63 | 165 | <0.2 |
| 9 | 60 | 40 | Yes | 16.4 | 81 | 158 | High |
| 10 | 0 | 100 |  |  | 0 |  | High |

Example 2

Polypropylene-Random Copolymer-Graft-Unsaturated Polyester

The experiment described in Example 1 was repeated. In this case PP random copolymer, Tenite P5-001, 5.5 percent ethylene, MFR=7.0 grams per 10 minutes from Eastman Chemical Company was used. The compositions and analysis by TCB recrystallization, DSC melting point and IR Carbonyl (CO) are given in Table 2 below.

TABLE 2

Blends of Polypropylene Random Copolymer with Unsaturated Polyester

| Run # | PP % | UP % | Peroxide | MFR g/10 min | Crystalline % | Melting Point °C. | % CO by IR |
|---|---|---|---|---|---|---|---|
| 1 | 100 | 0 |  | 18 | 75 | 134 | 0 |
| 2 | 95 | 5 | No | 19.2 | 88 | 137.5 | 0.27 |
| 3 | 95 | 5 | Yes | 83.5 | 97 | 136 | 0.56 |
| 4 | 90 | 10 | No | 11.2 | 81 | 138 | 1.18 |
| 5 | 90 | 10 | Yes | 62.7 | 88 | 137 | 2.29 |
| 6 | 80 | 20 | No | 78.8 | 73 | 135 | 0.07 |
| 7 | 80 | 20 | Yes | 58.6 | 61 | 137 | 4.93 |
| 8 | 60 | 40 | No | 218.9 | 51 | 135.5 | 0.09 |
| 9 | 60 | 40 | Yes | 19.2 | 79 | 136.5 | 6.74 |

Example 3

Polypropylene Impact Copolymer-Graft-Unsaturated Polyester

The experiment described in Example 1 was repeated. In this case PP impact copolymer, Tenite P6M5U-003, MFR=18 grams per 10 minutes, second reactor content (F$_c$)=21 percent, ethylene content of second reactor product (E$_c$)=60 percent from Eastman Chemical Company was used. The compositions and analysis by TCB recrystallization, DSC melting point and IR Carbonyl (CO) are given in Table 3 below.

TABLE 3

Blends of Polypropylene Impact Copolymer with Unsaturated Polyester

| Run # | PP % | UP % | Peroxide | MFR g/10 min | Crystalline % | Melting Point °C. | % CO by IR |
|---|---|---|---|---|---|---|---|
| 1 | 100 |  |  | 7 | 90 | 161 | 0 |
| 2 | 95 | 5 | No | 8.0 | 91 | 159.3 | 0 |
| 3 | 95 | 5 | Yes | 96.6 | 95 | 157.3 | 0.1 |
| 4 | 90 | 10 | No | 15.4 | 83 | 162.7 | <0.2 |
| 5 | 90 | 10 | Yes | 54.8 | 92 | 156.1 | 1.2 |
| 6 | 80 | 20 | No | 41.6 | 74 | 160.7 | <0.2 |
| 7 | 80 | 20 | Yes | 65.1 | 84 | 158.4 | 2.6 |
| 8 | 60 | 40 | No | 182.9 | 54 | 161.5 | <0.2 |
| 9 | 60 | 40 | Yes | 20.0 | 83 | 158.7 | 12.8 |

Example 4

Polypropylene-Graft-unsaturated Polyester Using Twin-Screw Extruder

A blend of 2270 grams of Tenite polypropylene powder, p6-005 impact copolymer with MFR=1.8 grams per 10 minutes, $F_c=25$ percent, $E_t=60$ percent from Eastman Chemical Company, 1513 grams of unsaturated polyester, see above, and 14.2 grams (0.37 percent of total weight) of VAROX DBPH-50 was fed into the throat of a BERSTORFF 43 L/D 25-mm twin-screw extruder. Melt temperature was 208° C. at 200 RPM, residence time was 1.5 to 4.2 minutes- The product was 81 percent crystalline by the TCB recrystallization test, MFR was 7.7 grams per 10 minute, melting point was 154° C., and [CO] was>20 percent.

Analysis of the product was performed by carbon-13 and proton nuclear magnetic resonance (NMR).

C-13NR (o-dichlorobenzene) : δ21.8, 26.7, 27.5, 28.8, 30.0, 30.4, 30.9, 33.3, 35.3, 35.8, 37.6, 39.6, 41.3, 46.7, 51.1, 58.9, 70.5, 70.8, 71.0, 71.6 ppm. H-NMR(o-dichlorobenzene): 0.8, 1.2, 1.6, 7.0 ppm.

Example 5

Preparation of Unsaturated Polyester

A 20-L resin kettle fitted with a Dean-Start trap was charged with 4021.8 grams (38.6 mole) of neopentyl glycol, 2803.5 (18.9 mole) of phthalic acid, and 1856.0 grams (18.9 mole) of maleic anhydride- The mixture was heated to 200° C. and held at 200° C. for 17 hours during which time 670 milliliter of water was removed and collected. The mixture was poured out. Acid number was 20 milligram KOH per gram polymer, ICI viscosity was 8.5 at 175° C., number average molecular weight (Mn) was 2000 grams per mole.

Example 6

Seventeen hundred and seventy and six tenths g of a crystallized poly(ethylene terephthalate) commercially available as Kodapak PET 7352 having an inherent viscosity of 0.70 (in 60/40 phenol/tetrachlorethane solution at 23° C.) is dried at 150° C. for 16 hours in dessicant air [Dew point <−20° C. (−20° F.)]. The PET and forty-five and four tenths g of a polypropylene-g-unsaturated polyester (-1801-107-2, as described in Example 4 of pp-graft preparations) and four hundred fifty four g of a 2:1 preblended rubber comprised of three hundred and two and sixty six hundredths g of an unmodified EPR (Polysar 306) and one hundred fifty one and thirty three hundredths g of a maleated EPR, Exxelor VA-1803 are pellet blended in a polyethylene bag and placed in the hopper (under dry N2) of a Werner and Pfleiderer Corporation ZSK-28 corotating, intermeshing twin screw extruder. The blend is melt processed at 260° C., stranded and pelletized. The I.V. of the PET portion of the blend is 0.56. The pelletized blend is dried at 100° C. for 8 hours in dessicant air and injection molded on a Boy 22S injection molding machine using a melt temperature of 260° C. and a mold temperature of 23° C. to provide amorphous test specimens. The I.V. of the PET portion of the blend after molding is 0.53. The impact properties of the blend are shown below in comparison to the properties of the PET unmodified control treated in an identical manner and a PET control which was not subjected to the blending step.

| | 6a PET Control Mold Only | 6b PET Control Process and Mold | 6c PET/2% PP-g-UP/20% 2:1 Polysar/ Exxelor EPR |
|---|---|---|---|
| I.V. dl/g, Before/ after | 0.71/0.67 | 0.60/0.59 | 0.56/0.53 |
| Izod Impact Strength ft lb/in. ASTM-256-56 | | | |
| Notched, 23° C. | 0.92 5CB | 1.05 5CB | 9.6 5PB |
| −40° C. | 0.49 5CB | 0.56 5CB | 1.8 5CB |

The notched Izod impact strength of the compatibilized blend is 9.6 ft lb/in. compared to 0.92 ft lb/in. for the PET control. In addition, the mode of failure has changed from brittle to ductile. The notched Izod impact strength at −40° C. is 1.8 ft lb/in. for the blend compared to 0.49 ft lb/in. for the PET control. Note that the impact strength of the compatibilized blend is improved even though the I.V. of the PET matrix has been substantially reduced through melt processing.

Example 7

The procedure of Example 6 is followed except that the PP-g-UP component of the blend is left out. The total rubber concentration is 20 wt. %, as in Example 6. The notched Izod impact strength of this blend is 1.6 ft/lb in. with brittle failure and the −40° C. notched Izod impact strength is 1.1 ft lb/in. The effect of removing the compatibilizing agent from the blend on impact strength is clear.

Examples 8–9

The procedure of Example 6 is followed except that the PP-g-UP component is left out and the rubber portion is comprised only of the Polysar EPR at concentrations of 20 and 30 wt. %. The impact properties of the blends are shown below.

| Izod Impact Strength ft lb/in. ASTM-256 | Example 8 PET/20% Polysar 306 EPR | Example 9 PET/30% Polysar 306 EPR |
|---|---|---|
| Notched, 23° C. | 1.43 CB | 2.03 CB |
| −40° C. | 1.19 CB | 1.43 CB |

These examples show the effect of using an EPR rubber that has a much higher melt viscosity than the PET matrix resulting probably in a poor dispersion of the rubber phase. The 2:1 blend of the Polysar EPR and the Exxelor maleated EPR more closely matches the melt viscosity of the PET matrix. In addition, the maleated EPR provides improved interaction for compatibilization with the PET matrix. However, all of these parameters do not provide improved impact strength with only 20 wt. rubber in the blend unless the PP-g-Up compatibilizing agent is present.

Comparative Example 1

Blend of Polypropylene and Unsaturated Polyester Without Peroxide

The same experiment as described in Example 4 was conducted except no peroxide was used. The product had MFR=76 grams per 10 minute, crystalline content was 56 percent, [CO] was 2,8 percent, melting point was 148.5 and 157.5° C.

Comparative Example 2

Polypropylene Unsaturated Polyester Blend Prepared with High Level of Peroxide

The blend described in Example 4 was prepared with the modification that 1.5 percent VAROX DBPH-50 was used. The product had MFR=16.0 grams per 10 minute, crystalline content was 47 percent; however, a significant amount (48 percent) of crosslinked material (insoluble in refluxing TCB) was isolated. The crystalline material contained <0.2 CO, melting point was 143.5 and 156° C.

Comparative Example 3

Treatment of Unsaturated Polyester with Peroxide

A Brabender Plasti-corder ® was charged with the UP described in Example 1. The mixture was heated to 190° C. The level of peroxide was varied as shown below. The amount of crosslinked material (gel) was determined by solubility in refluxing TCB. Results are given in Table 4.

TABLE 4

Treatment of Unsaturated Polyester with Peroxide

| Experiment | DBPH-50 | GEL, % |
|---|---|---|
| 1 | 0 | 0 |
| 2 | 0.6 | 8.5 |
| 3 | 0.28 | 31 |
| 4 | 1.5 | 100 |

We claim:

1. A composition comprising a blend of
(A) 0.5 to 5 wt. % of a polypropylene-graft-unsaturated polyester comprising the reaction product of;
  (a) about 1 to 99 wt. % of a polypropylene homopolymer or α-olefin propylene copolymer containing at least 70 wt. % propylene;
  (b) about 1 to 99 wt. % of an unsaturated polyester derived from an α, β-ethylenically unsaturated dicarboxylic acid, saturated dicarboxylic acid, and saturated aliphatic polyol;
  (c) about 0.1 to 1 weight percent of a free radical initiator;
(B) at least 50 wt. % of a polyester; and
(C) at least 10 wt. % of an ethylene-propylene rubber containing at least a portion of maleated ethylene-propylene rubber.

2. The composition according to claim 1 wherein the blend contains 1 to 3 wt. % (A), 70 to 84 wt. % (B) and 15 to 30 wt. % (C).

3. The composition according to claim 2 wherein component (A) is present in the concentration of about 2 wt. %.

4. The composition according to claim 1 wherein the polyester of (B) is prepared from dicarboxylic acids selected from the group consisting of terephthalic acid, isophthalic acid, 1,4-cyclohexanedicarboxylic acid, succinic acid, glutaric acid, adipic acid, azelaic acid, fumaric acid, maleic acid, itaconic acid and mixtures thereof; and glycols selected from the group consisting of ethylene glycol, 1,3-propanediol, 1,4-butanediol, 1,5-pentanediol, 1,6-hexanediol, 1,8-octanediol, 1,9-nonanediol, 1,10-decanediol, 1,2-cyclopentanediol, 1,3-cyclopentanediol, 1,2-cyclohexanediol, 1,3-cyclohexanediol, 1,4-cyclohexanediol, 1,4-cyclohexanedimethanol, and mixtures thereof.

5. The composition according to claim 4 wherein the polyester of (B) is poly(ethylene terephthalate).

6. The composition according to claim 5 wherein said poly(ethyleneterephthalate) has an inherent viscosity of 0.4 to 1.0, in 60/40 phenol/tetrachloroethane at 230° C.

7. The composition according to claim 1 wherein said ethylene-propylene rubber is a blend of unmodified ethylene-propylene rubber and maleated ethylene-propylene rubber.

8. The composition according to claim 7 wherein said maleated ethylene-propylene rubber has been grafted with about 0.2 to 2 wt. % maleic anhydride.

9. The composition according to claim 1 wherein (C) is a blend of nonfunctionalized ethylene-propylene rubber and maleated ethylene-propylene rubber in a ratio about two to one.

10. The composition according to claim 1 wherein said ethylene-propylene rubber has a flow rate of about 1 to 5 and an ethylene to propylene ratio of about 70/30 to 30/70.

11. The composition according to claim 10 wherein said ethylene-propylene rubber has a flow rate of about 1.2 to 2 and an ethylene to propylene ratio of about 50/50.

12. The composition according to claim 1 wherein the concentration of reactants (a) and (b) are 40 to 90 wt. % (a) and 10 to 60 wt. % (b).

13. The composition according to claim 1 wherein reactant (a) is selected from the group consisting of isotactic propylene homopolymer having a xylene solubles content less than 10 wt. % at 25° C. and $C_2$–$C_8$ α-olefin propylene random copolymers with a concentration of α-olefin in the copolymer in the range of 0.5 to 30 mol percent.

14. The composition according to claim 1 wherein reactant (b) is essentially linear and the saturated aliphatic polyol component is present in the unsaturated polyester such that the concentration of hydroxy groups is in a 5 to 25% molar excess over the carboxyl groups of the α,β-ethylenically unsaturated dicarboxylic acid component.

15. The composition according to claim 1 wherein the α,β-ethylenically unsaturated dicarboxylic acid is selected from the group consisting of maleic, fumaric, substituted fumaric citraconic, messaconic, teraconic, glutaconic, muconic, and mixtures of acids thereof; the saturated dicarboxylic acid of reactant (b) is selected from the group consisting of oxalic, malonic, succinic, glutaric, sebacic, adipic, phthalic, isophthalic, terephthalic, substituted phthalic, and mixtures of acids thereof; and the saturated aliphatic polyol used to prepare reactant (b) is a diol selected from the group consisting of ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,4, pentanediol-1,5, hexanediol-1,6, neopentyl glycol, 2,2,4-trimethyl-1,3-pentanediol and mixtures thereof.

16. The composition according to claim 1 wherein said free radical initiator is a peroxide selected from the group consisting of t-butylhydroperoxide, di-t-butylperoxide, 2,5-dimethyl,-2,5-di(t-butylperoxy) hexane, t-butyl-perbenzoate, 1,1,3,3-tetramethylbutyl hydroperoxide, and 2,5-dimethylhexyl 2,5-diperoxybenzoate.

17. An article of manufacture comprising a molded article of the composition of the claim 1.

18. An article of manufacture comprising a fiber of the composition of claim 1.

19. The process for producing a blend comprising mixing at a temperature between 180° and 240° C.
 (A) 0.5 to 5 wt. % of a polypropylene-graft-unsaturated polyester comprising the reaction product of
  (a) about 1 to 99 wt. % of a polypropylene homopolymer or α-olefin propylene copolymer containing at least 70 wt. % propylene;
  (b) about 1 to 99 wt. % of an unsaturated polyester derived from an α, β-ethylenically unsaturated dicarboxylic acid, saturated dicarboxylic acid, and saturated aliphatic polyol;
  (c) about 0.1 to 1 weight percent of a free radical initiator;
 (B) at least 50 wt. % of a polyester; and
 (C) at least 10 wt. % of an ethylene-propylene rubber containing at least a portion of maleated ethylene-propylene rubber.

20. The process according to claim 19 wherein the mixing temperature is between 190° and 210° C.

* * * * *